United States Patent
Diener et al.

(10) Patent No.: US 7,003,673 B1
(45) Date of Patent: Feb. 21, 2006

(54) METHOD FOR STORING AND OPERATING ON DATA UNITS IN A SECURITY MODULE AND ASSOCIATED SECURITY MODULE

(75) Inventors: Sébastien Diener, Saint Quay Portrieux (FR); Franz Trierweiler, Versailles (FR)

(73) Assignee: CP8 Technology, Paris (FR)

( * ) Notice: Subject to any disclaimer, the term of this patent is extended or adjusted under 35 U.S.C. 154(b) by 0 days.

(21) Appl. No.: 09/601,957

(22) PCT Filed: Dec. 10, 1999

(86) PCT No.: PCT/FR99/03086

§ 371 (c)(1),
(2), (4) Date: Oct. 20, 2000

(87) PCT Pub. No.: WO00/36511

PCT Pub. Date: Jun. 22, 2000

(30) Foreign Application Priority Data

Dec. 11, 1998 (FR) .................................. 98 15650

(51) Int. Cl.
*G06F 11/30* (2006.01)
*G06F 12/14* (2006.01)
*H04L 9/32* (2006.01)

(52) U.S. Cl. ........................................ 713/190; 726/26

(58) Field of Classification Search ................. 713/190
See application file for complete search history.

(56) References Cited

U.S. PATENT DOCUMENTS

| 4,064,558 | A | | 12/1977 | Hughes et al. | |
|---|---|---|---|---|---|
| 4,461,001 | A | * | 7/1984 | Bossen et al. | 714/702 |
| 4,992,936 | A | * | 2/1991 | Katada et al. | 711/209 |
| 5,081,675 | A | | 1/1992 | Kittirutsunetorn | |
| 5,257,361 | A | * | 10/1993 | Doi et al. | 711/207 |

FOREIGN PATENT DOCUMENTS

WO    WO93/23806    11/1993

* cited by examiner

*Primary Examiner*—Gilberto Barrón, Jr.
*Assistant Examiner*—G. Gurshman
(74) *Attorney, Agent, or Firm*—Miles & Stockbridge P.C.; Edward J. Kondracki (57) ABSTRACT

The invention relates to a method for storing information in information storage means of a security module and for operating on information units in a security module, and the associated security module, wherein two storage areas (41, 42) are defined, one of which (41) is for storing the information (a, b, c; d, e, f) in dispersed pieces (a, b, c), (d, e, f), the other of which (42) is for storing addresses (AA, 92) at which the pieces of information are located. The storage in the second storage area takes place in positions that are based on the addresses (83, 86) of the pieces of information in the first storage area (41), as defined before dispersion.

12 Claims, 6 Drawing Sheets

METHOD FOR STORING AND OPERATING ON DATA UNITS IN A SECURITY MODULE AND ASSOCIATED SECURITY MODULE

FIELD OF THE INVENTION

The invention relates to a method for storing and operating on information units in a security module. The term "security module" should be understood either in its conventional sense, in which it designates a device whose purpose in a communication or information network is to be held by an authority supervising the network and to store, in protected fashion, secret and fundamental parameters of the network such as cryptographic keys, or more simply, as designating a device allocated to various users of the network and allowing each of them to access the latter, this latter device also being capable of holding secret parameters. The security module could take the form of a portable object such as, for example, a chip card containing an embedded chip or integrated circuit.

DESCRIPTION OF RELATED ART

It is known that a hacker is capable of reading or altering information contained in information storage means, particularly in electronic chip memories, using an electronic microscope or means for producing radiation, depending on the circumstances. However, in order to be effective, he must not only access the stored information, but also identify the function of this information in the operation of the security module.

SUMMARY OF THE INVENTION

The main object of the invention is to offer a method for storing information that makes it much more difficult to identify the function assigned to each piece of stored information.

To this end, the invention relates to a method for storing information in information storage means of a security module, characterized in that it comprises the steps consisting of:
  defining, in the storage means, a first storage area for storing pieces of information that can be accessed by designating logical addresses;
  defining, in the storage means, a second storage area for storing physical addresses of these pieces of information defining their position in the first storage area, these physical addresses being located at a position that is based on the respective logical addresses of the information;
  storing the information in the first storage area in a position that is based on the respective logical addresses, and the logical addresses of this information in the second storage area in a position that is based on these logical addresses; and
  permuting the logical addresses of the information units in the second storage area, two by two, in order to define their physical addresses, and after each permutation, permuting the two corresponding information units in the first storage area, or vice versa.

In a variant, the method for storing information in information storage means of a security module is characterized in that it comprises the steps consisting of:
  defining, in the storage means, a first storage area for storing pieces of information that can be accessed by designating logical addresses;
  defining, in the storage means, a second storage area for storing physical addresses of these pieces of information defining their position in the first storage area, these physical addresses being located in a position that is based on the respective logical addresses of the information;
  randomly storing in the second storage area the logical addresses of the information in order to define physical addresses of this information; and
  storing the pieces of information in the first storage area in a position that is based on their respective physical addresses.

Thus, the units of information are dispersed in the storage means, which in practice prevents them from being identified. Improvements disclosed in the present document make it possible to protect the stored information even more.

The invention also relates to a corresponding operating method and security module.

BRIEF DESCRIPTION OF THE DRAWINGS

Other details and advantages of the present invention will emerge during the following description of a preferred but non-limiting embodiment, in reference to the attached drawings in which.

DESCRIPTION OF THE PREFERRED EMBODIMENT(S)

Figure 1:
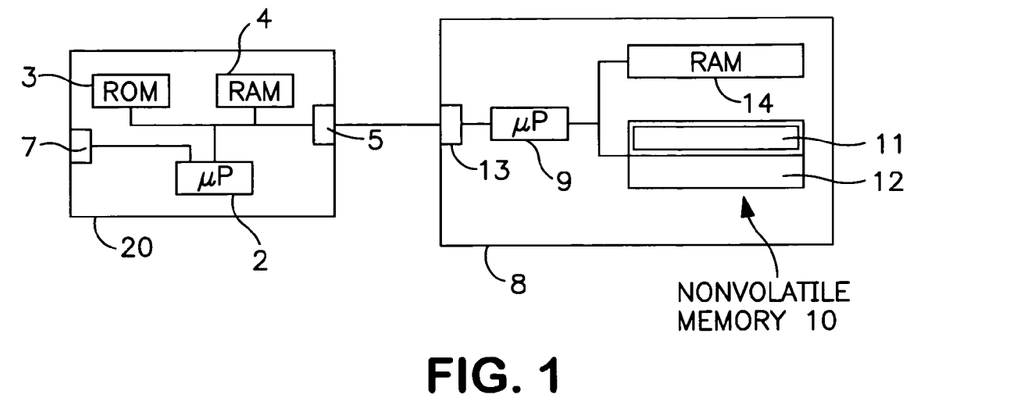
FIG. 1 represents a data processing device cooperating with a security module.

FIG. 1 represents a data processing device 1 cooperating with a portable object 8. The data processing device, in an essentially known way, comprises the microprocessor 2 to which are connected a ROM 3, a RAM 4, means 5 for cooperating with the portable object 8 with or without physical contact, and a transmission interface 7 that allows the data processing device to communicate with a data communication network. The data processing device 1 can also be equipped with storage means such as diskettes or disks, which may or may not be removable, entry means (such as a keyboard and/or a pointing device of the mouse type) and display means, which various means are well known in the art and consequently not represented in FIG. 1.

The data processing device can be constituted by any computing device installed at a private or public site capable of providing means for managing information or delivering various goods or services, which device may be permanently installed or portable. It can also be a device dedicated to telecommunications.

Furthermore, the portable object 8 has a chip that includes information processing means 9 which may be in the form of a microprocessor, a nonvolatile memory 10, a volatile working memory RAM 14, and means 13 for cooperating with the data processing device 1. This chip is laid out so as to define, in the memory 10, a secret area 11 in which information, once stored, is inaccessible from outside the chip and accessible only to the processing means 9, and an accessible area 12 that the microprocessor 9 makes accessible from outside the chip for the reading and/or writing of information. Each area of the nonvolatile memory 10 can comprise an unmodifiable ROM part and a modifiable part that is an EPROM, EEPROM or is constituted by a RAM of the "flash" type, or FRAM (the latter being a ferromagnetic RAM), i.e. having the characteristics of an EEPROM with access times identical to those of a conventional RAM.

For the chip, it is possible to use a self-programmable microprocessor with a nonvolatile memory, as described in U.S. Pat. No. 4,382,279 in the name of the Applicant. As indicated in column 1, lines 13–25 of this patent, the self-programmable feature of the chip corresponds to the capability for a program fi located in a ROM to modify another program fj located in a programmable memory in a program gj. In a variant, the microprocessor of the chip is replaced—or at least supplemented—by logic circuits installed in a semiconductor chip. In essence, such circuits are capable of performing calculations, particularly authentication and signature calculations, as a result of their hardwired, rather than microprogrammed logic. They can also be of the ASIC ("Application Specific Integrated Circuit") type.

Figure 2:
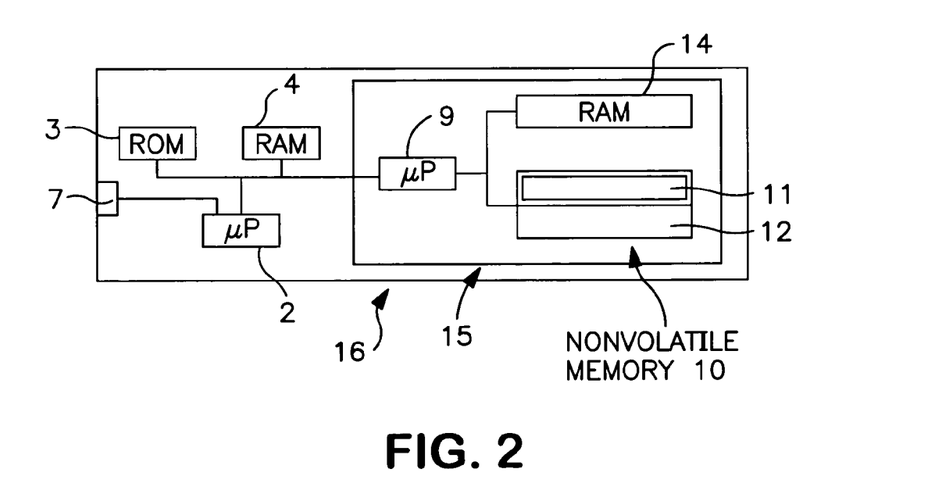
FIG. 2 represents a variant of a security module.

A variant of FIG. 1 is illustrated in FIG. 2, in which the data processing device 16 comprises, in addition to the elements of the data processing device 1 of FIG. 1, those of the portable object 8 disposed in a module 15, the elements common to both FIGS. 1, 2 having the same references. However, the cooperation means 5, 13 of FIG. 1 are replaced by a permanent link between the microprocessor 2 and the microprocessor 9.

According to a variant of FIG. 2, the data processing device is constituted by the module 15 of FIG. 2 itself.

According to the invention, the physical location and the structure of a piece of sensitive information in one of the memories of the portable object 8 or the module 15 changes randomly over time. Let S be a set of n storage cells (c0, c1, c2, . . . , c(n-1)) and let f be a dispersion function for dispersing the content of any cell $c_i$ from an original address to a dispersed address $f(c_i)$. The function f verifies the following two properties:

$$c_i \neq c_j \Rightarrow f(c_i) \neq f(c_j)$$

$$c_i \in S \Rightarrow f(c_j) \in S$$

(where $\epsilon$ is a symbol that means "belonging to")

Figure 3:
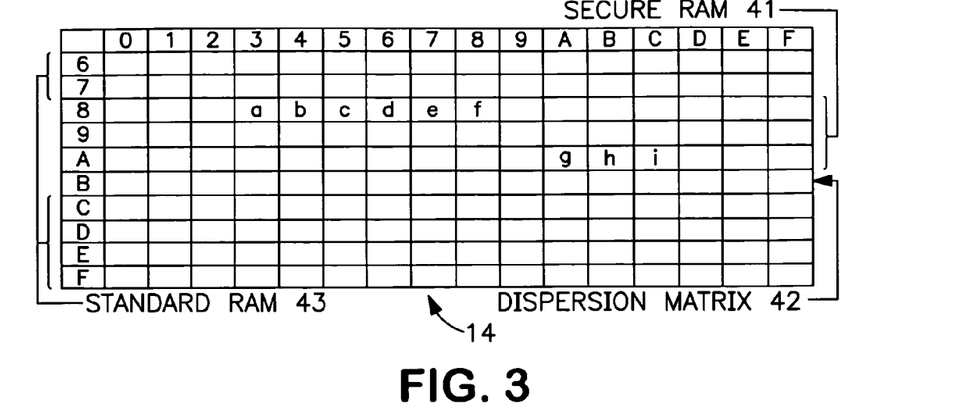
FIG. 3 represents a volatile memory of the security module incorporating two specific storage areas, respectively constituting a secure RAM and a dispersion matrix.

For example, FIG. 3 represents the structure of the RAM 14 of the portable object 8 or the module 15. It comprises 16 columns identified by the numbers 0 through nine, followed by the letters A through F (hexadecimal notation), and 10 lines identified by the numbers 6 through 9 followed by the letters A through F. these lines and columns define one hundred sixty cells beginning with the cell 60 (i.e. line 6, column 0) and ending with the cell FF (i.e. line F, column F). Each cell stores a binary octet.

The RAM is broken down into three different areas. A first area 41 comprises the cells 80 through AF and is called "secure RAM" because its content will be protected by means of the above-mentioned function f: it is in this area that the sensitive information to be protected will be stored. A second area 42 comprises the cells B0 through BF and is called a "dispersion matrix" because it will be used to disperse the sensitive information in the secure RAM. Finally a third area 43, called "standard RAM," comprises the remaining cells, i.e. 60 through 7F: it is used to store the nonsensitive information. It is noted that although, in this example, the secure RAM and the dispersion matrix are composed of contiguous cells, they could, in a variant, the composed of noncontiguous cells.

Figure 4:
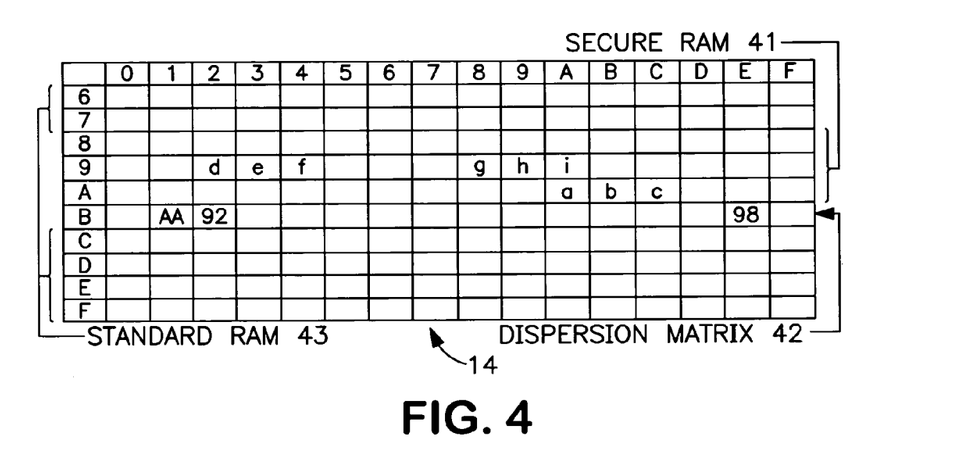
FIG. 4 represents the memory of FIG. 3, with a dispersion of the information units in the secure RAM 41.

According to a preferred embodiment, all of the information stored in the secure RAM is broken down into several elements called "information units," each comprising the same given number of cells. In the example of FIGS. 3 and 4, each information unit is surrounded by a bold line and comprises three cells: we see, for example, the information unit (a, b, c) whose content is distributed in the cells with the respective addresses 83, 84, and 85, the information unit (d, e, f), and the information unit (g, h, i). The set of two contiguous information units (a, b, c) and (d, e, f) constitutes a complete piece of information I such as, for example, a password.

The size of the dispersion matrix 42, is based on the number of information units that can be contained in the secure RAM, since it comprises one particular cell for each information unit. In this example, the secure RAM comprises 48 cells, hence one-third that many information units, or sixteen cells B0 through BF. Each information unit is associated with a cell of the dispersion matrix which, in the storage area in question, occupies a position that is a specific function of a position occupied by the information unit in the secure RAM 41. In this example, the function is the identity, so each information unit is associated with a cell of the dispersion matrix that occupies the same position in the storage area in question. For example, the information unit (a, b, c) that has the row 2 in the secure RAM, is associated with the cell B1 that has the same position in the dispersion matrix. Likewise, the information unit (d, e, f) is associated with the third cell B2, and the information unit (g, h, i) is associated with the fifteenth cell BE. But in a variant, said function G can be more complex, the position $r_j$ of the cell of the dispersion matrix resulting from a mathematical formula determined from the position $r_i$ of the information unit, according to the formula: $r_j = G(r_i)$. The following is an example in the present case in which sixteen rows are defined: $r_j = 17 - r_i$.

By definition, the address of an information unit is constituted by the address of the first cell it relates to: thus, the address of the information unit (a, b, c) of FIG. 3 is 83, the address of its first cell containing the information (a), while the address of the information unit (g, h, i) is AA. In FIG. 3, the information units are disposed at so-called "logical addresses" corresponding to the addresses that must be provided to the portable object so that it can process these information units. A procedure for initializing the RAM 14, which makes it possible to define an initial storage state of the information units in the secure RAM 41, will now be explained. In a first phase, the dispersion matrix 42 is filled with the addresses of the information units that can be stored in the secure RAM 41, these addresses being selected randomly. In FIG. 4, only three of these addresses are represented: AA, 92 and 98. In a second phase, the information units to be stored in the secure RAM 41 are reentered based on the addresses contained in the dispersion matrix. For example, the information unit (a, b, c) is disposed at the address contained in the cell of the dispersion matrix that is associated with this information unit: we have seen that this means the cell in position 2. This information unit is therefore disposed at the address AA. Likewise, the information unit (d, e, f) is stored at the address 92, and the information unit (g, h, i) at the address 98. The addresses contained in the dispersion matrix of FIG. 4 are called "physical addresses" because they will determine the real location of the information units in the secure RAM 41. In FIG. 4, the secure RAM 41 is actually in a so-called "secure" state, since its information units have been dispersed relative to the state of FIG. 3.

Another procedure for initializing the RAM 14 will now be explained, in a variant. In a first phase, the dispersion matrix is filled with the logical addresses of the information units. Thus, the address corresponding to the first information unit, is placed in the first cell, i.e. 80. The logical address corresponding to the second information unit (a, b, c) is placed in the second cell, i.e. 83, etc. In a second phase, the secure RAM 41 is filled based on the addresses contained in the dispersion matrix. Thus, as represented in FIG. 3, the information unit (a, b, c) is stored in the second position, the information unit (d, e, f) in the third position, etc. Finally, in a third phase, the information units of the secure RAM 41 are dispersed two by two, using an elementary permutation process described below, until all the information units have been moved. In a variant, it would be possible to reverse the order of the first and second phases.

In operation, when the microprocessor executes a program that requests access to a piece of information such as the aforementioned information I by designating the logical addresses 83 and 86, the microprocessor will consult the dispersion matrix 42. It will read the first physical address written in the cell in position 2, i.e. AA, then it will read the content of the information unit (a, b, c) beginning at this address in secure RAM. Next, it will read the second physical address written in the cell in position three, i.e. 92, then it will read the content of the information unit (d, e, f) beginning at this address in secure RAM: it will then have reconstituted the information I.

According to the first embodiment described above, the information is dispersed in the secure RAM by modifying its structure, i.e. the order in which the information units are arranged in the cells composing information in question, but without achieving a maximum degree of dispersion. The variant of FIG. 5, on the other hand, makes it possible to achieve this objective. In this example, each information unit corresponds to only one cell of the secure RAM 41: it follows that the dispersion matrix 44 comprises as many cells as the secure RAM, i.e. forty-eight, disposed between the addresses B0 and DF.

Figure 5:
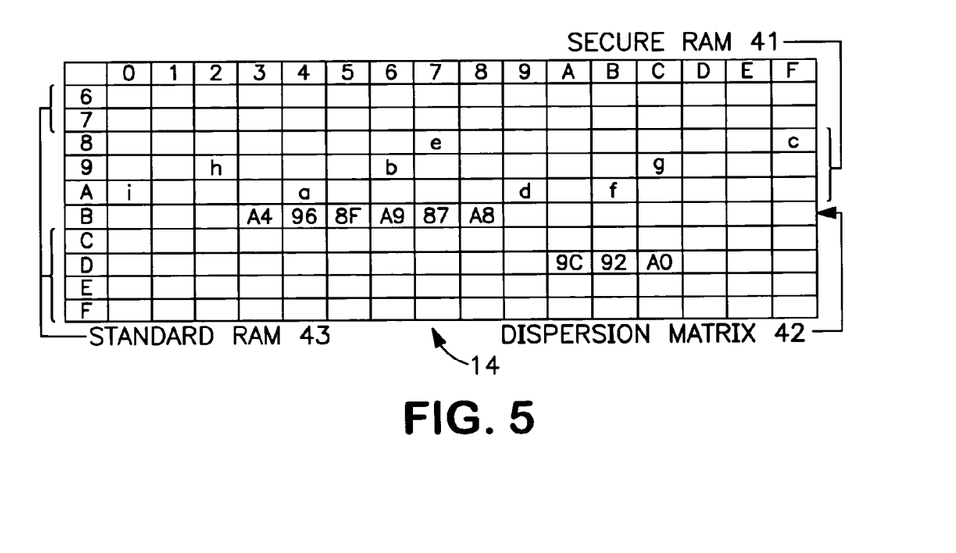
FIG. 5 is a variant of FIG. 4, in which each information unit occupies only one storage cell.

After all the addresses of the information units have been written into the dispersion matrix 44 and these addresses have been randomly modified as explained for the preceding example, the result is the dispersion matrix of FIG. 5, in which only the physical addresses of the nine information units (a through i) appearing in the secure RAM of FIG. 3 are represented. For example, the physical address of the information unit (b) is stored in the cell in the same position as (b), i.e. position 5: this address is therefore 96. Likewise, the physical address of the information unit (g) is located in the cell DA of the dispersion matrix and equals 9C.

Then, the microprocessor of the card disperses the information units (a through i) in the secure RAM, based on the physical addresses found in the dispersion matrix 44. For example, the information unit (c) is stored in the cell of the secure RAM 41 whose address is written in the cell B5 of the dispersion matrix 44, i.e. the address 8F. Likewise, the physical address of the unit of information (f) is the value AB written in the cell B8.

It may be seen that, in this second example, the information I, formed by six elementary pieces of information (a through f) that succeed one another in contiguous fashion in FIG. 3, is broken down to such a degree that the six pieces of information (a through f) are no longer contiguous at all. Naturally, this property strengthens security, since the hacker's job of reconstituting the set of information (a through f) from the secure RAM, in the state in which exists in FIG. 5, is much more complicated than it was from the secure RAM in FIG. 4. As a general rule, the greater the number of cells in each information unit, the weaker the protection of the sensitive information.

In the following, the address of each cell of each area of the RAM 14 is defined by a given shift from an origin point constituted by the address of the first cell of the area, in accordance with an addressing mode specific to a certain type of microprocessor. In a variant, it would naturally be possible to define an absolute address of each cell, independent of the other cells, as was done in connection with FIGS. 3 through 5.

Referring to FIG. 6, which again represents the RAM structure of FIG. 5, let pRamSec be a pointer selecting the first cell 45 of the secure RAM, and let pMat be a pointer selecting the first cell 46 of the dispersion matrix. Any cell of the dispersion matrix contains a value that represents a shift relative to the pointer pRamSec. Let us assume that the microprocessor has to obtain the content of a cell 47 of the secure RAM whose logical address it knows, defined as follows:

pRamSec+logical shift

Figure 6:
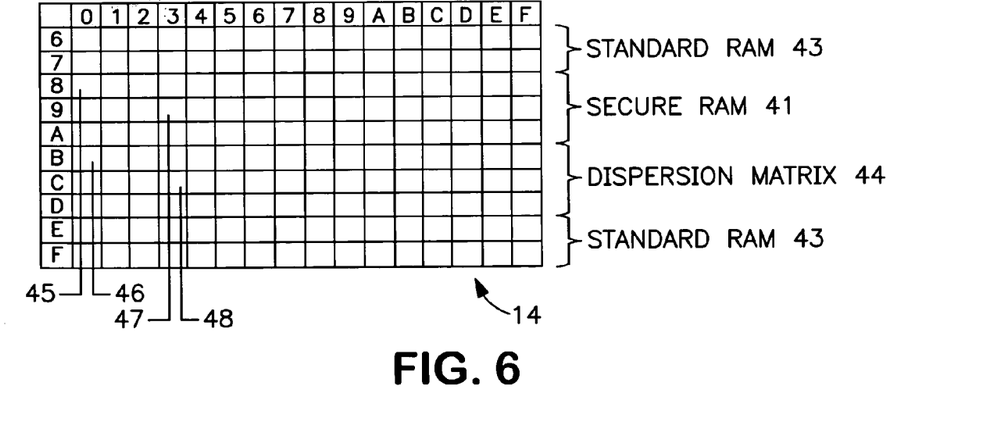
FIG. 6 illustrates the marking of the cells by a pointer.
Figures 7, 11:
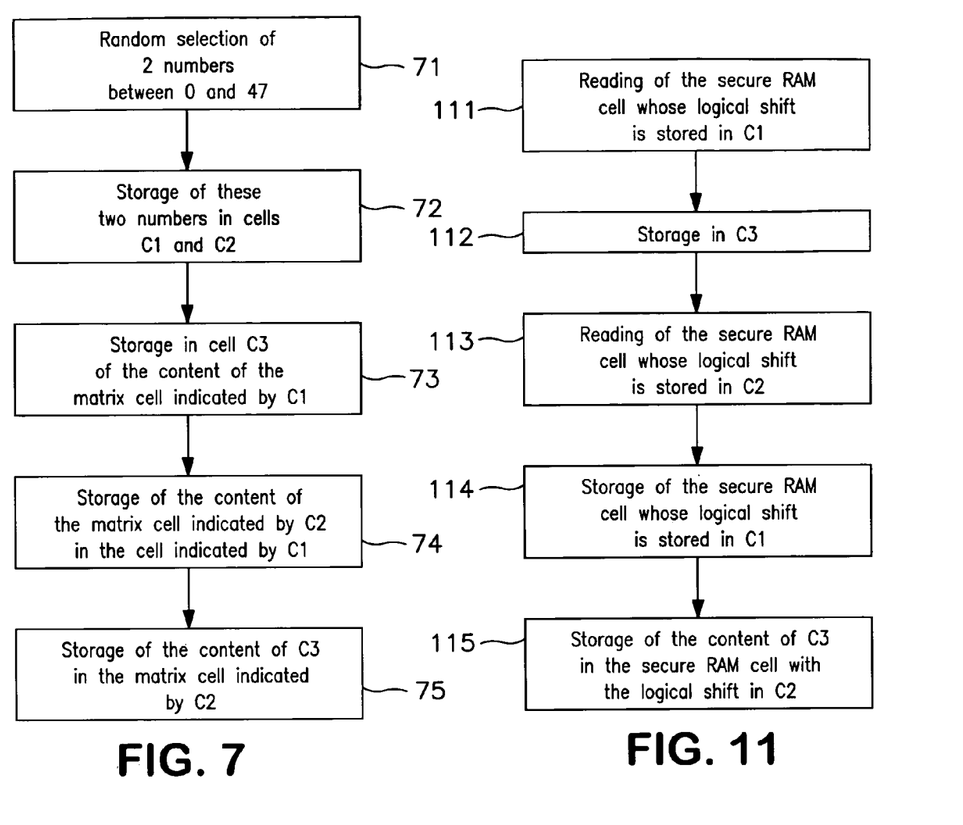
FIG. 7 is a flow chart of a procedure for inverting two cells of the dispersion matrix.
FIG. 11 is a flow chart of a procedure for inverting two cells of the secure RAM, which follows the procedure of FIG. 7.

The corresponding physical address is given by:

pRamSec+physical shift if (physical shift) is equal to the content of the cell 48 of the dispersion matrix which is homologous to the cell 47, i.e. which has the same position in the matrix, the cell 48 has the following address: pMat+logical shift.

We then know how to determine the physical address of a cell to be addressed from its logical address: a reading at this physical address gives us a value stored at this address.

Figure 8:
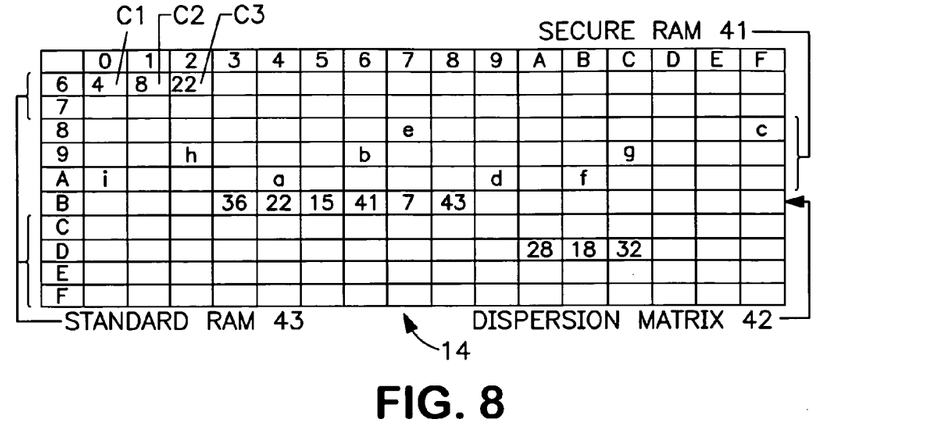
FIGS. 8 through 10 represent the volatile memory during three successive steps of the procedure of FIG. 7.
Figure 9:
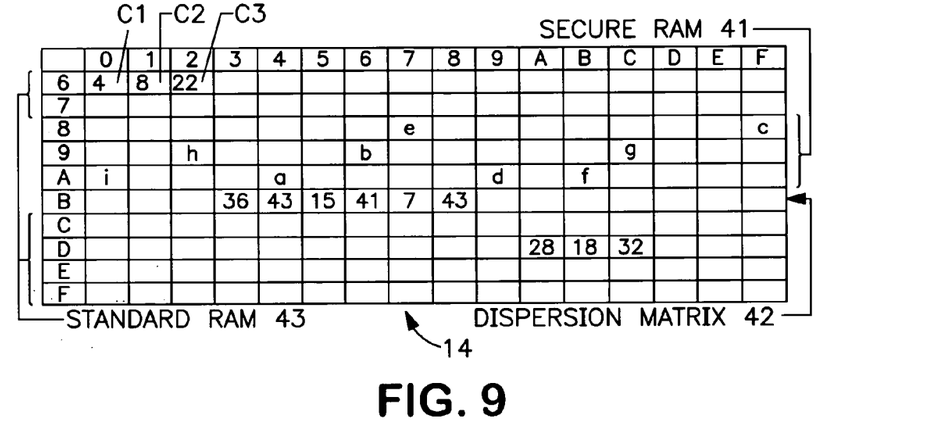
Figure 10:
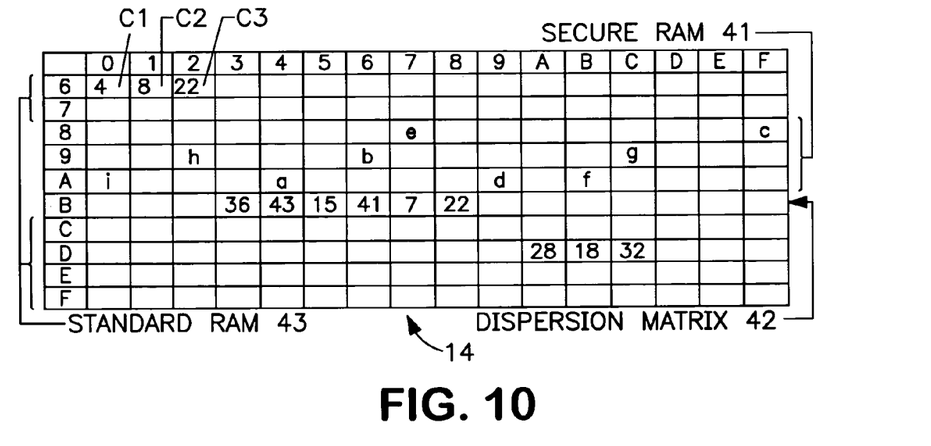

We will now described a preferred method for performing an elementary permutation of the contents of two cells of the secure RAM selected randomly, in connection with FIGS. 7 through 10. First of all, as illustrated by step 71 of FIG. 7, the microprocessor 9 performs a random selection of two numbers from a set constituted by the addresses of all the cells of the secure RAM 41, defined by their logical shift: the forty-eight cells are defined by a logical shift having a value between 0 and 47. For example, the values 4 and 8 are selected: they are then stored in two cells C1 and C2 of the standard RAM 43, in accordance with step 72 of FIG. 7, the result being represented in FIG. 8. In step 73, the content of the cell of the dispersion matrix 44 indicated by the logical shift contained in the cell C1 is stored in a cell C3 of the standard RAM 43: the logical shift being 4, the corresponding logical address is pMat+4, related to the cell B4 whose content is 22. The result is represented in FIG. 8. Then, in step 74, the content of the cell of the dispersion matrix indicated by the cell C2 is stored in the cell indicated by the cell C1: the logical shift contained in the cell C2 is 8, which indicates the cell with the address pMat+8, i.e. the cell B8: its content 43 is disposed in the cell with the address pMat+4, i.e. the cell B4. The result is represented in FIG. 9. Finally, in step 75, the content of the cell C3 is stored in the cell of the dispersion matrix 44 indicated by the content of the cell C2, i.e. the cell with the logical address pMat+8, i.e. the cell B8: the result is represented in FIG. 10. It may be seen by observing FIGS. 8 and 10 that the logical shift values 22 and 43 have been inverted.

Figure 12:
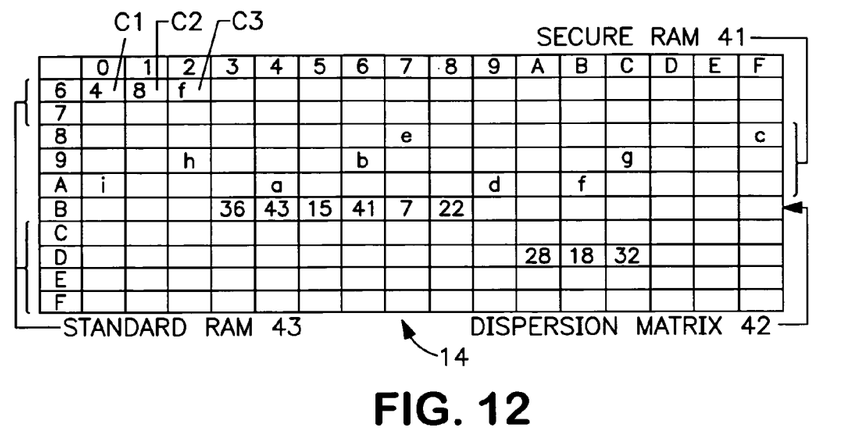
FIGS. 12 through 14 represent the volatile memory during three successive steps of the procedure of FIG. 11.
Figure 13:
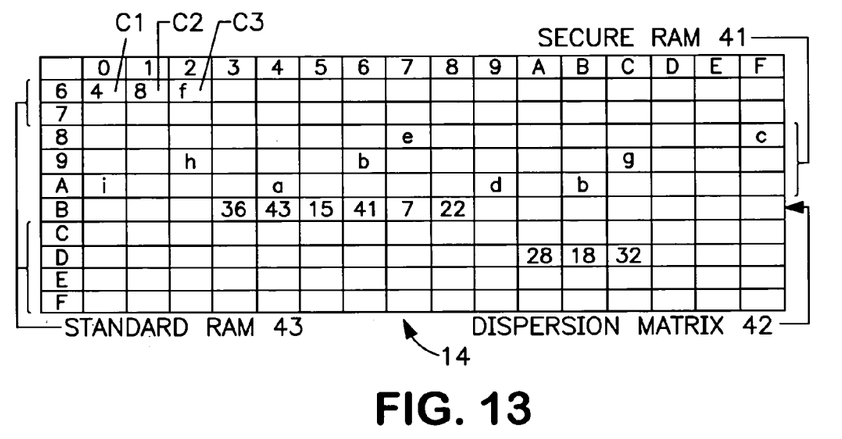

A permutation of the addresses having been performed in the dispersion matrix 44, it is now necessary to perform a corresponding permutation of the data associated with these addresses in secure RAM 41. In step 111 of FIG. 11, the content of the cell of the secure RAM 41, whose logical address is defined by the content of the cell C1, is read. The logical shift value 4 returns to the cell B4 of the dispersion matrix, which contains the physical shift 43: the corresponding address in secure RAM 41 is therefore pRamSec+43, corresponding to the cell AB. In step 112, the content of this cell is stored in the cell C3, as represented in FIG. 12. In step 113, the microprocessor reads the content of the cell of the secure RAM 41 whose address is defined by the content of the cell C2. The value 8 returns to the cell B8 of the dispersion matrix containing the physical shift 22: the corresponding address in secure RAM 41 is therefore pRamSec+22, corresponding to the cell 96, containing the value b. In step 114, this value is stored in the cell of the secure RAM 41 whose logical shift is stored in the cell C1: the logical shift 4 corresponds to a physical shift 43, which designates the cell AB of the secure RAM 41. The result is represented in FIG. 13. Finally, in step 115, the microprocessor stores the content f of the cell C3 in the cell of the secure RAM 41 having the logical shift stored in the cell C2, i.e. the address 96. The result appears in FIG. 14. By comparing FIGS. 12 and 14, it is possible to see that the values b, f have been permuted.

Figure 14:
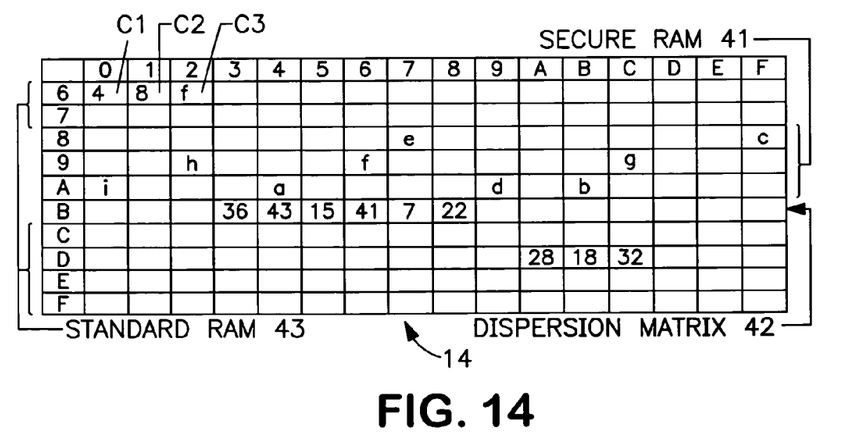

It is possible to see in FIG. 14 the correspondence between the permuted addresses of the dispersion matrix and the permuted values of the secure RAM 41. For example, in FIG. 3, the value (f) has an address defined by the logical shift 8, or in FIG. 14, the physical shift 22. It may be seen that the value f is actually located in the cell 96 having this physical shift.

Figure 15:
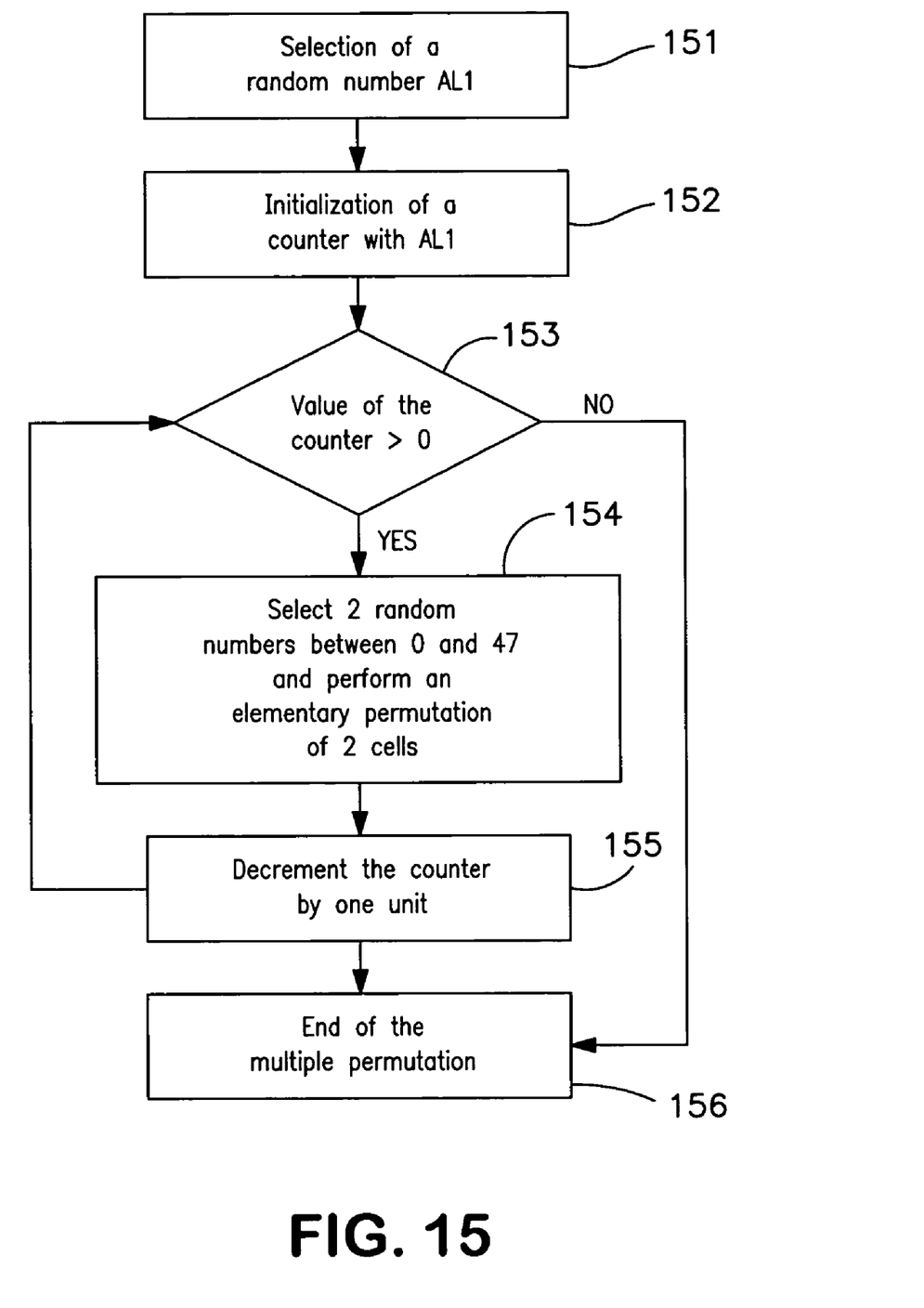
FIG. 15 is a flow chart of a procedure for multiple permutation of the cells of the secure RAM.

In practice, the microprocessor will perform not just one, but a certain number of elementary permutations constituting a so-called "multiple" permutation in accordance with the procedure of FIG. 15. In step 151, the microprocessor selects a random number AL1: typically this number will be, for example, between 0 and 256. In step 152, the microprocessor initializes a counter with the value AL1. In step 153, the microprocessor verifies that the counter has a positive value. If so, it performs an elementary permutation in accordance with the procedure of FIGS. 7 and 11, selecting two random numbers between zero and 47. In step 155, the microprocessor decrements the counter by one unit, then it returns to step 153. Once the counter has reached the value 0, it reaches the end of the multiple permutation, indicated in 156.

The multiple permutation process, or process for regenerating the dispersion matrix that has just been described, will be activated at various moments. It will be activated, first of all, after each power-up of the card. It will also be activated at certain critical moments during a utilization session of the card, for example when sensitive information is processed. Thus, the loading of the PIN (Personal Identification Number) into secure RAM 41 assumes the transfer of 8 bytes to this memory: it was decided to initiate a regeneration of the dispersion matrix after the loading of each byte of the PIN. Another example is the one in which an abnormality is detected in a security register of the card. It will be recalled the card includes, in an essentially known way, a plurality of sensors that make it possible to test various physical characteristics of the card, for example its temperature, the amount of radiation to which it may be subjected, the electrical continuity of a shield for protection against mechanical stress, etc. The state of the sensors at a given moment is recorded in this security register. It is possible to decide to test the state of the security register at certain critical moments, for example before processing sensitive information, and if an abnormality is detected, to initiate a regeneration of the dispersion matrix.

According to a variant of the invention, the dispersion matrix is located in a memory of the card or of the security module that is different from that which constitutes the secure memory. This is particularly advantageous when wishing to save on secure memory. For example, in reference to FIG. 1, the dispersion matrix could be in nonvolatile memory 10.

It is noted that one advantageous result of the invention consists in that the time it takes the microprocessor to access any of the information stored in the secure RAM 41 is constant. This is achieved by associating the information units with their addresses using a matrix correspondence (a correspondence between the cells of the secure RAM 41 and those of the dispersion matrix). This prevents any hacker observing the microprocessor from making distinctions between the accesses to the various information units, which distinctions might have given him information on the manipulated data.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A security module comprising:
    information processing means and information storage means,
    said information processing means including means for defining, in the information storage means, a first storage area for storing pieces of information that can be accessed by designating logical addresses; and a second storage area for storing physical addresses of said pieces of information,
    said physical addresses defining positions of said pieces of information in the first storage area, and
    said physical addresses being located in positions in the second storage area that are based on position numbers associated with the respective logical addresses of the pieces of information.

2. A method for storing information in information storage means of a security module, the method comprising:
    defining a first storage area in the storage means for storing pieces of information that can be accessed by designating logical addresses;
    defining a second storage area in the storage means for storing physical addresses of said pieces of information, said physical addresses defining positions of said pieces of information in the first storage area (41), and said physical addresses being located in a position positions in the second storage area that are based on position numbers associated with the respective logical addresses of the pieces of information;

storing the pieces of information in the first storage area in a position that is based on the respective logical addresses, and the logical addresses of said information in the second storage area in a positions that are based on position numbers associated with the respective logical addresses; and permuting the logical addresses of the information units in the second storage area, two by two, in order to define their physical addresses, and after each permutation, permuting the two corresponding pieces of information in the first storage area, or vice versa.

3. A method for storing information in information storage means of a security module, the method comprising:

defining a first storage area in the storage means for storing pieces of information that can be accessed by designating logical addresses;

defining a second storage area in the storage means for storing physical addresses of said pieces of information, said physical addresses defining positions of said pieces of information in the first storage area, and said physical addresses being located in a positions in the second storage area that are based on position numbers associated with the respective logical addresses of the pieces of information;

randomly storing in the second storage area the logical addresses of the information in order to define the physical addresses of the information; and storing the pieces of information in the first storage area in a position that is based on their respective physical addresses.

4. A method for operating on information in information storage means of a security module comprising:

defining on the storage means a first storage area for storing pieces of information accessible by designating logical addresses, and defining a second storage area for storing physical addresses of said pieces of information, said physical addresses defining positions of said pieces of information in the first storage area, and said physical addresses being located in positions in the second storage area that are based on position numbers associated with the respective logical addresses of the pieces of information, and accessing any piece of information designated by its logical address by reading data in said second storage area in a position that is based on a position number associated with said logical address so as to identify the physical address of said piece of information in said second storage area.

5. An operating method according to claim 4, further comprising:

periodically randomly modifying the position of the physical addresses of the pieces of information in the second storage area, and of correspondingly modifying the position of the information units in the first storage area.

6. An operating method according to claim 5, wherein the periodic modification of the position of the physical addresses and of the pieces of information is activated when a piece of sensitive information is processed.

7. An operating method according to claim 5, further comprising:

permuting the physical addresses of the pieces of information in the second storage area and, after each permutation, permuting the two corresponding pieces of information in the first storage area.

8. An operating method according to claim 4, further comprising:

storing information units having a size smaller than the size of the pieces of information in the first storage area; said pieces of information being accessible by designating said logical addresses and being stored in a position defined by said physical addresses.

9. An operating method according to claim 8, wherein said storage means comprise: several cells and each piece of information has a size such that it is stored in only one cell of the first storage area and its physical address is stored in only one cell of the second storage area.

10. An operating method according to claim 8, further comprising:

periodically randomly modifying the position of the physical addresses of the pieces of information in the second storage area, and of correspondingly modifying the position of the pieces of information in the first storage area.

11. An operating method according to claim 10, wherein the periodic modification of the position of the physical addresses and of the pieces of information is activated when a piece of sensitive information is processed.

12. An operating method according to claim 10, further comprising:

permuting the physical addresses of the pieces of information in the second storage area and, after each permutation, permuting the two corresponding pieces of information in the first storage area.

* * * * *

UNITED STATES PATENT AND TRADEMARK OFFICE
CERTIFICATE OF CORRECTION

PATENT NO. : 7,003,673 B1  
DATED : February 21, 2006  
INVENTOR(S) : Sebastien Diener and Franz Trierweiler It is certified that error appears in the above-identified patent and that said Letters Patent is hereby corrected as shown below:

Title page,
Item [73], Assignee, delete "Technology" and replace with -- Technologies --.

Column 8,
Line 66, delete "a position".

Column 9,
Line 23, delete "a" before "positions".

Signed and Sealed this

Second Day of May, 2006

JON W. DUDAS
*Director of the United States Patent and Trademark Office*